United States Patent [19]

Paulsson

[11] Patent Number: 4,702,343

[45] Date of Patent: Oct. 27, 1987

[54] NONDESTRUCTIVE DOWNHOLE SEISMIC VIBRATOR SOURCE AND PROCESSES OF UTILIZING THE VIBRATOR TO OBTAIN INFORMATION ABOUT GEOLOGIC FORMATIONS

[75] Inventor: Björn N. P. Paulsson, Fullerton, Calif.

[73] Assignee: Chevron Research Company, San Francisco, Calif.

[21] Appl. No.: 841,074

[22] Filed: Mar. 18, 1986

[51] Int. Cl.⁴ ............................................. G01V 1/40
[52] U.S. Cl. ..................................... 181/106; 181/113; 181/121; 367/912
[58] Field of Search ................ 367/25, 31, 30, 911, 367/912; 181/101, 102, 105, 106, 108, 111, 113, 121; 175/40; 166/65.1; 73/152, 576, 578

[56] References Cited

U.S. PATENT DOCUMENTS

| | | | |
|---|---|---|---|
| 2,522,433 | 9/1950 | Dahlberg | 181/106 |
| 2,604,181 | 7/1952 | Basham et al. | 181/105 |
| 3,208,550 | 9/1965 | Castanet et al. | 367/190 |
| 3,221,833 | 12/1965 | Malmberg | 181/106 |
| 3,716,111 | 2/1973 | Lavergne | 181/113 |
| 4,033,429 | 7/1977 | Farr | 181/106 |
| 4,050,540 | 9/1977 | Cholet et al. | 181/114 |
| 4,252,209 | 2/1981 | Silverman | 181/106 |
| 4,302,825 | 11/1981 | Erich, Jr. | 367/41 |
| 4,421,199 | 12/1983 | Miller | 181/121 |
| 4,428,422 | 1/1984 | Laurent | 166/212 |
| 4,497,044 | 1/1985 | Silverman | 367/41 |
| 4,516,230 | 5/1985 | Goodloe et al. | 367/190 |
| 4,569,412 | 2/1986 | Bouyoucos et al. | 367/911 |

FOREIGN PATENT DOCUMENTS 0672588 5/1979 U.S.S.R. .

OTHER PUBLICATIONS

H. C. Hardee, "Downhole Periodic Seismic Sources, Geophysical Prospecting 31, 57–71, 1983.
P. A. Heelan, S. J., "Radiation from a Cylindrical Source of Finite Length", Geophysics, vol. 18, 1953, pp. 685–696.

*Primary Examiner*—Charles T. Jordan
*Assistant Examiner*—John W. Eldred
*Attorney, Agent, or Firm*—S. R. LaPaglia; E. J. Keeling; V. A. Norviel

[57] ABSTRACT

The invention relates to a nondestructive downhole seismic source capable of generating $S_V$-waves, $S_H$-waves, and P-waves alone or in combination to determine information about a surrounding geologic formation. The invention also includes processes of performing crosswell tomography and reverse vertical seismic profiling. The invention also includes a means and process to carry out in hole seismic logging operations.

29 Claims, 13 Drawing Figures

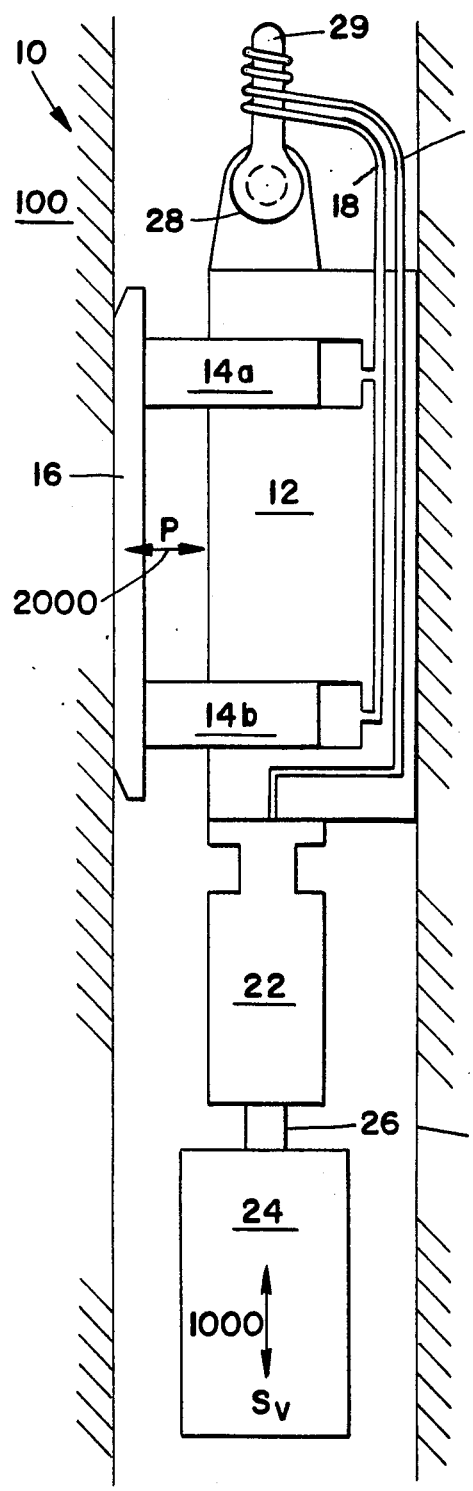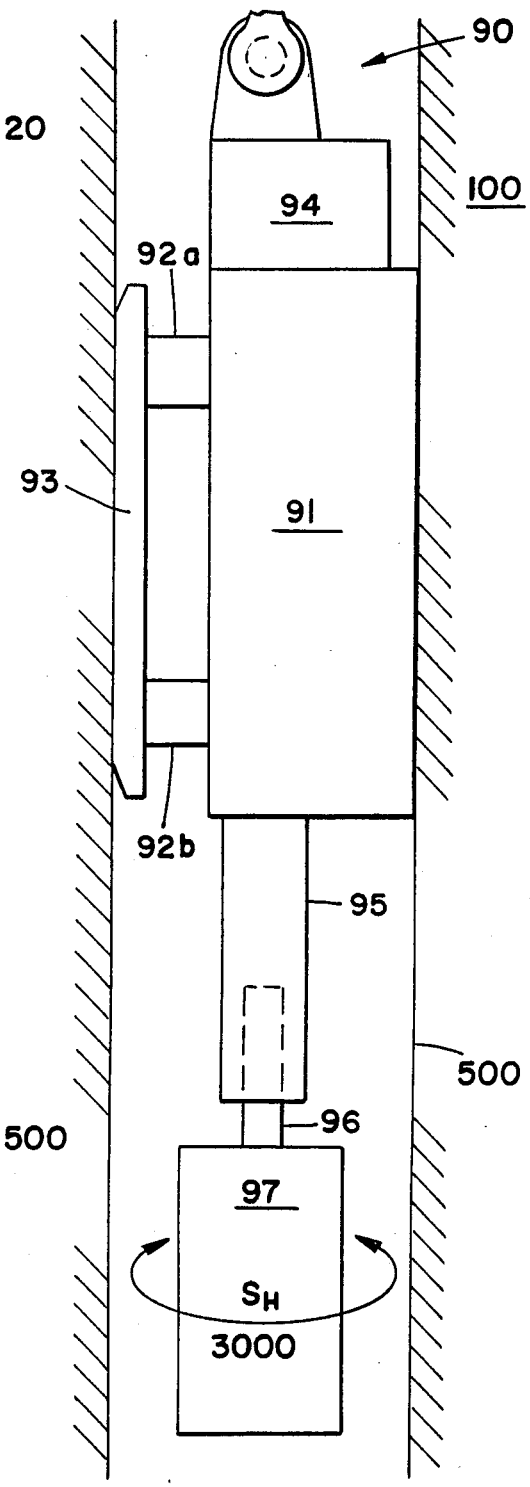
FIG_1  FIG_6

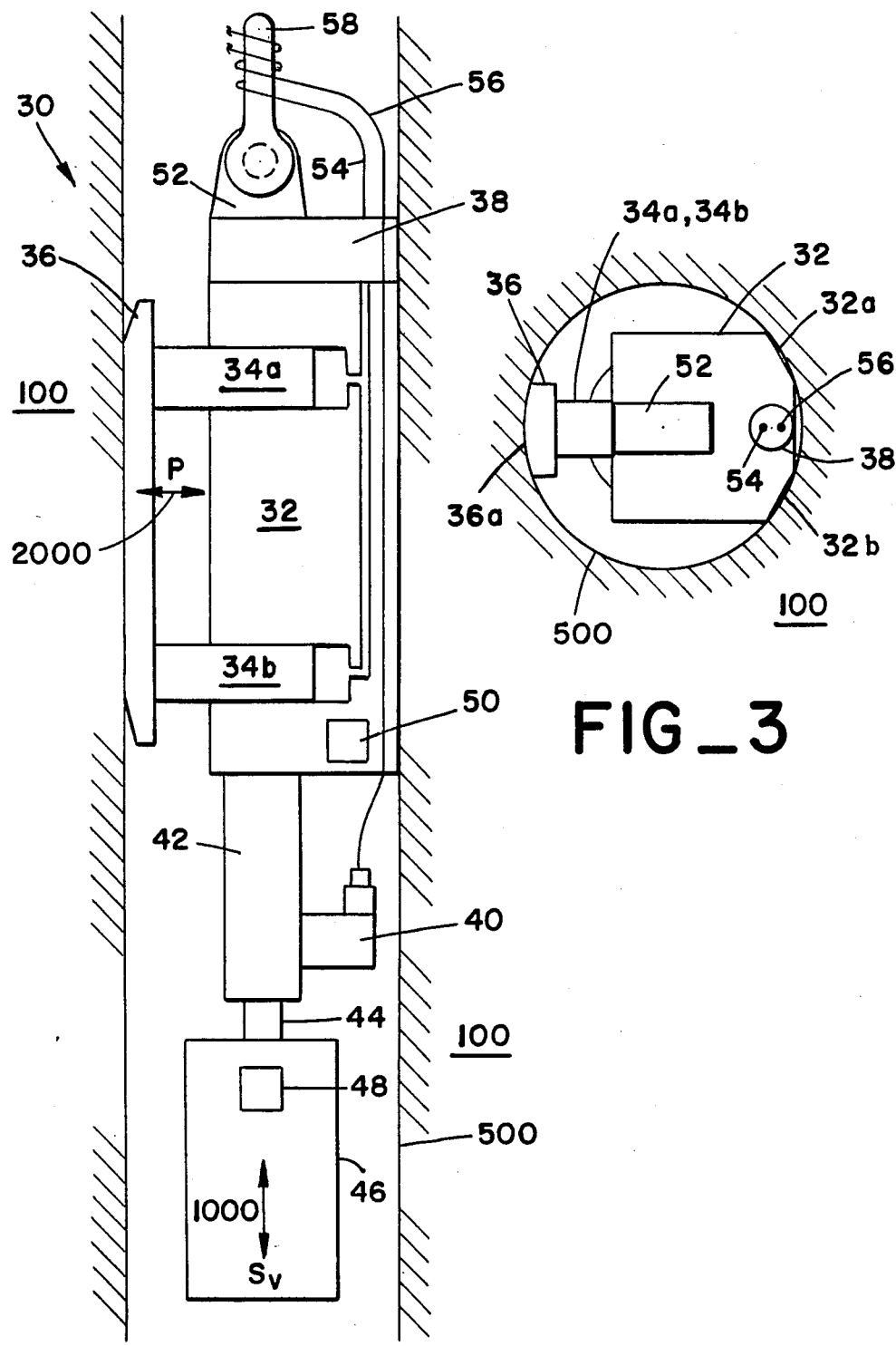
FIG_3
FIG_2

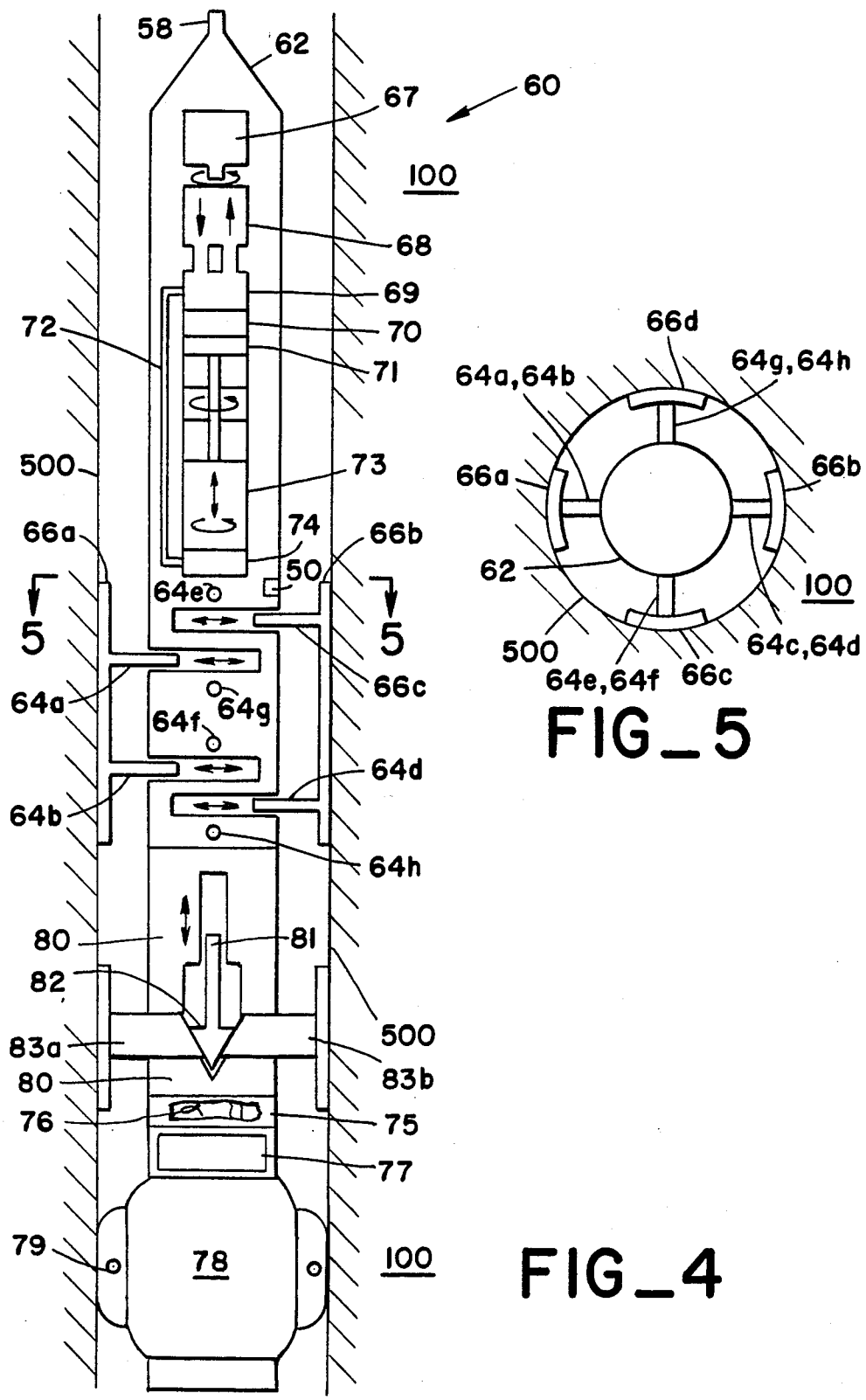

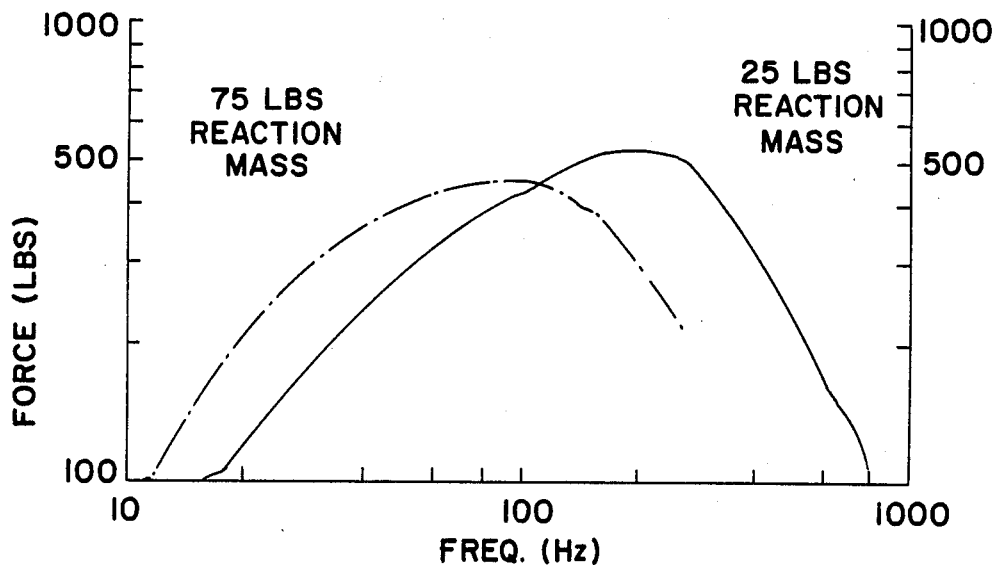
FIG _ 7
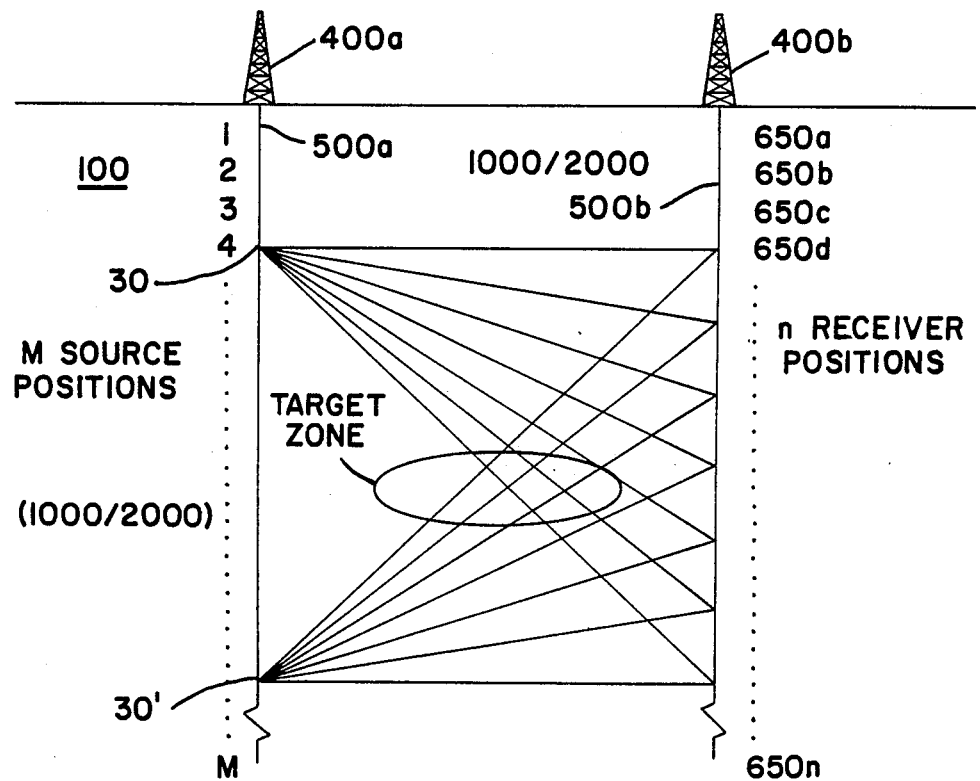
FIG _ 11

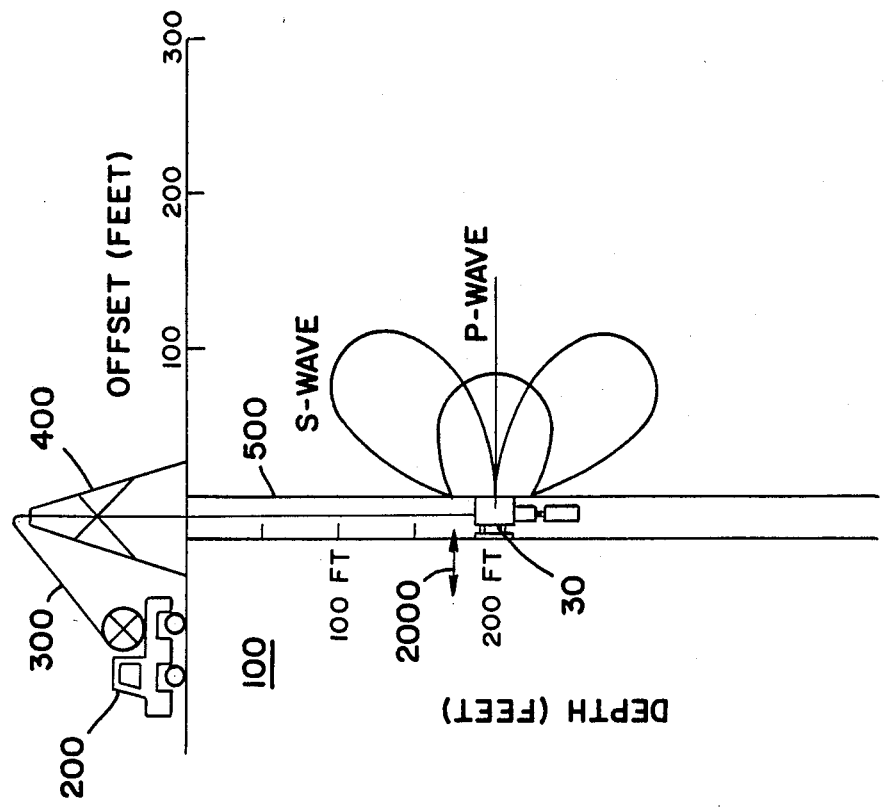
FIG_9
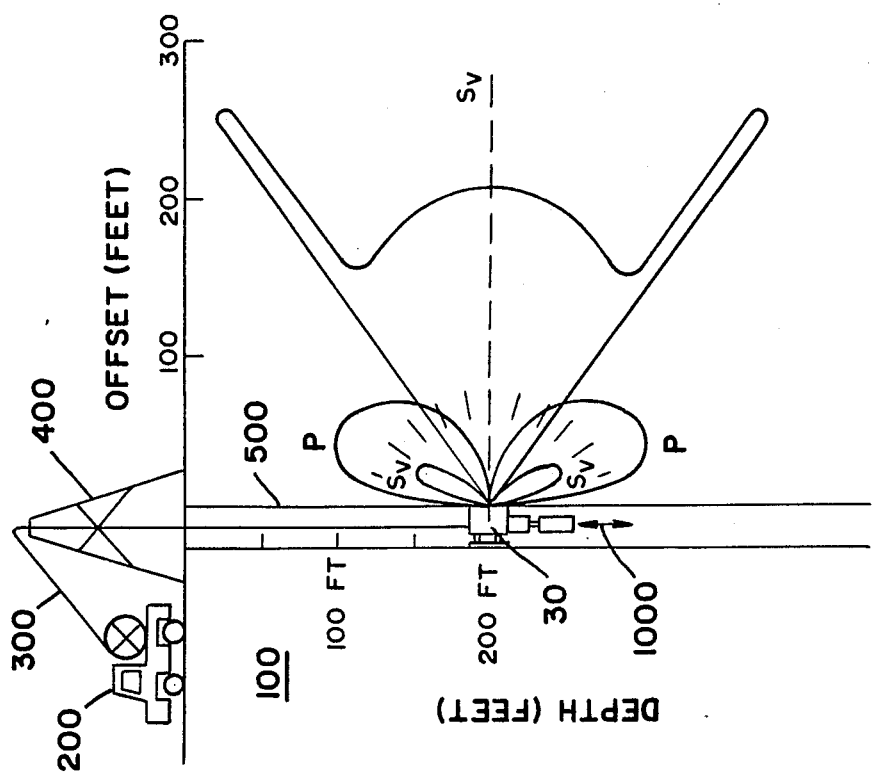
FIG_8

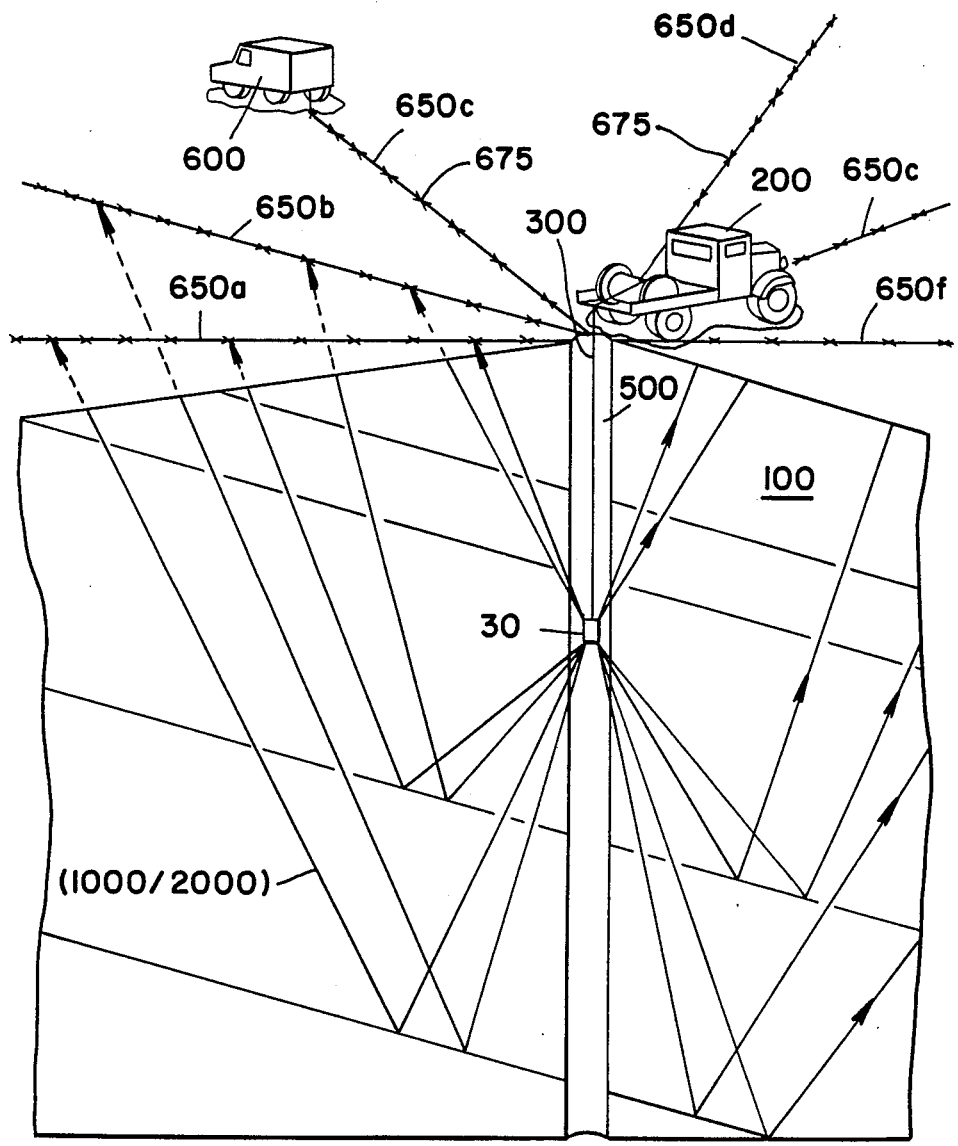
FIG _ 10

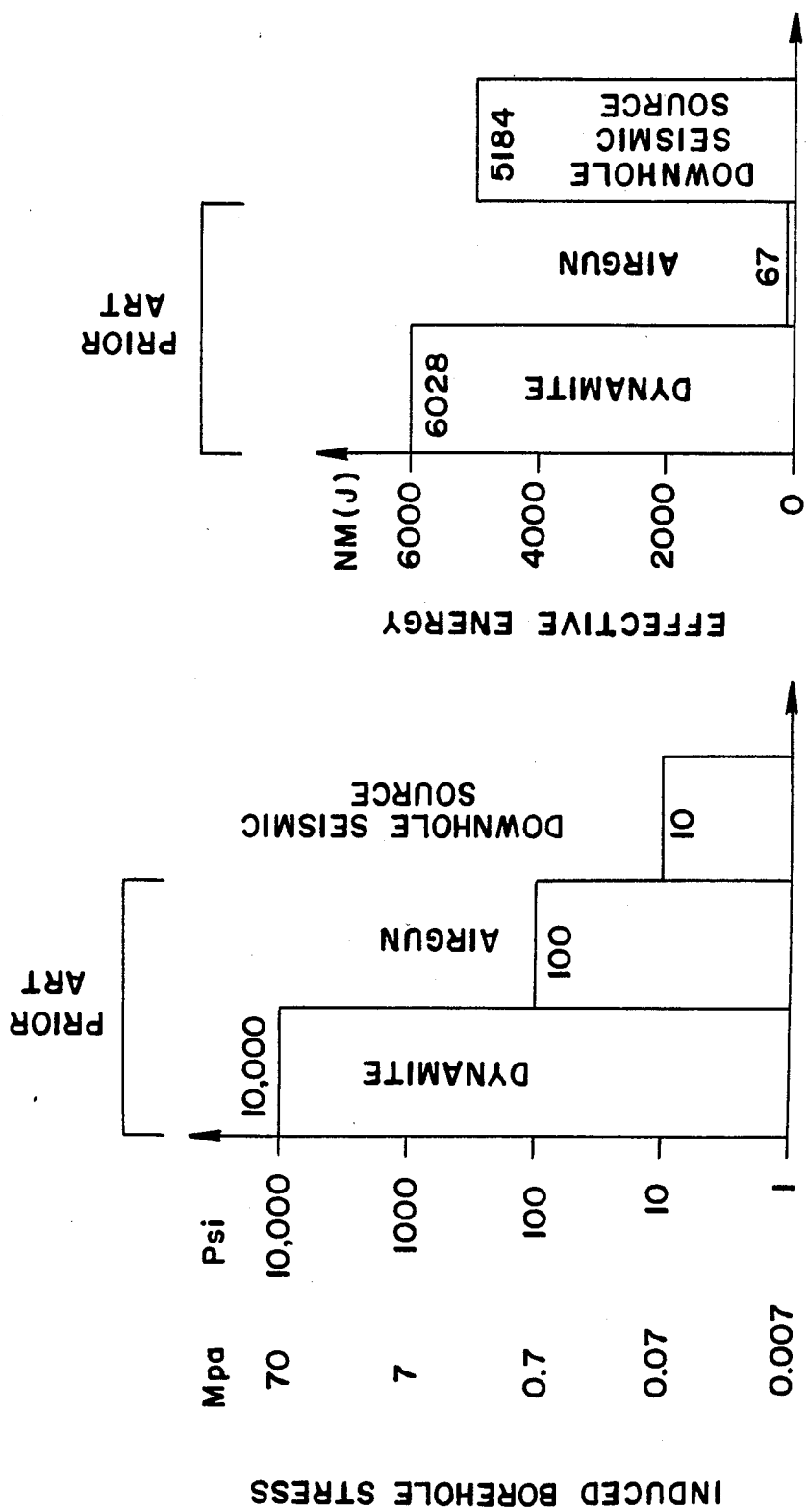

NONDESTRUCTIVE DOWNHOLE SEISMIC VIBRATOR SOURCE AND PROCESSES OF UTILIZING THE VIBRATOR TO OBTAIN INFORMATION ABOUT GEOLOGIC FORMATIONS

CROSS REFERENCE TO RELATED APPLICATION

This application is related to the application entitled DOWNHOLE ELECTROMAGNETIC SEISMIC SOURCE by BjÖRN N. P. PAULSSON filed concurrently herewith and assigned U.S. Ser. No. 841,073 and filed Mar. 18, 1986. Said application is completely incorporated herein by reference for all purposes.

FIELD OF THE INVENTION

This invention relates to downhole seismic sources. More specifically, this invention relates to nondestructive hydraulic downhole seismic sources and processes of obtaining information about underground formations penetrated by at least one wellbore.

BACKGROUND OF THE INVENTION

During drilling or after the completion of a well, it is often desirable to obtain information about the formation surrounding the wellbore. In wells completed into or through zones in the formation containing hydrocarbons, it is desirable to have techniques of obtaining information about these producing zones. Well logs are often run to determine such parameters as resistivity, conductivity and other parameters from which the properties of the oil and the producing formation can be deduced to give a clearer picture of the environment surrounding the wellbore.

One measurement technique involves the use of geophones which are lowered into the wellbore while surface seismic sources generate waves to pass through the geologic formation. The geophones sense these waves. Subsequent processing of the recordings derived from these waves provide a clearer picture of the environment surrounding the wellbore. However, the weathering layer of the earth's crust attenuates a great deal of the energy from the seismic sources before it reaches the zones of interest in the formation surrounding the wellbore. Providing a seismic source within a wellbore below the weathering layer and spaced from a different wellbore in which the geophones are located would remove the effects of the weathering layer.

Typically, a well is completed into a formation by cementing a liner within the wellbore. Any source used within the wellbore must be capable of imparting the desired amount of energy into the formation to be detected either at the surface or in an adjacent wellbore. However, the form of the energy must not input shear or compressive borehole stresses capable of separating the liner from the cement or casing. These stresses should be less than the maximum recommended shear stress on the casing cement interface, which is about 20 psi, as specified by the American Petroleum Institute (API RP2A Oct. 22, 1984).

FIG. 12 and FIG. 13 are graphs comparing the borehole stresses and effective energies between known destructive downhole sources, namely, a 1.1 lb (500 gm) dynamite charge, a 40 cu. inch (655 cc) airgun, and a 4,000 lbf output (18,000 newtons) seismic source of the invention. The values are applicable around 100 hz, a frequency which is within the usual frequency band. The figures show the seismic vibratory source achieves high effective energies with low borehole stresses. The 10 psi borehole stress induced by the seismic source of the invention is only half of the recommended maximum induced shear stress on the casing cement interface according to American Petroleum Institute standards (API RP2A Oct. 22, 1984).

Currently, a technique called 'Vertical Seismic Profiling', (VSP), is used to obtain information about particular zones of interest within the formation surrounding the wellbore. Typically, this technique requires lowering a geophone into a wellbore while providing various surface seismic energy sources, such as dynamite, to impart seismic energy into the formation to be received by the geophone. The geophone is lowered to a specific depth within the wellbore and a surface seismic energy source is located on the surface to impart the seismic energy into the formation which is detected by the geophone and recorded. The geophone is moved to a different depth and the process is repeated. The surface seismic energy source is moved to various locations at various offsets from the wellbore and the process is repeated. This process is extremely costly and time-consuming. The repeated use of destructive surface sources renders this process unsuitable for use in populated areas and unpopular with many surface landowners.

A great deal of the time and expense could be eliminated if a nondestructive seismic source could be placed in a wellbore to be used in a reverse VSP (RVSP) process. The RVSP process requires a source in a wellbore and numerous geophones on the surface. The seismic energy generated from the seismic source is detected by the geophones on the surface. Since numerous geophones can be laid out in a two-dimensional array from the wellbore, the location of the geophones can remain constant while the seismic source moves instead of requiring movement both of the seismic source and the geophones. Assuming a nondestructive seismic source can be located within a wellbore spaced from an adjacent wellbore containing one or more geophones, superior crosswell tomography processes of production wells can be performed because the source can be located below the attenuating weathering layer of the earth's crust. In studying the subterranean formations, it would be desirable to receive and analyze a host of different types of seismic waves, e.g., P-waves, $S_V$-waves, and $S_H$-waves. Thus, it would be highly desirable to have an apparatus capable of nondestructively generating one or more of these types of waves within a wellbore for reception by geophones located either at the surface or in an adjacent wellbore to deduce information about the formation. It would also be desirable to have a source which can nondestructively generate frequencies in excess of 100 Hz below the weathering layer to perform crosswell tomography and crosswell profiling. Crosswell tomography between adjacent wellbores cannot be adequately performed at the present time using oil wells because present available downhole seismic sources, e.g., dynamite or the air gun are all impulsive forces generating shear stress far in excess of API standards for detectable surface seismic waves. Attempts to tomographically image reservoirs using surface data gathering sources, e.g., geophones, have failed due to the attenuation and filtering of the higher frequencies by the weathering layer, as well as unfavorable source-receiver configuration.

SUMMARY OF THE INVENTION

I have invented a nondestructive downhole seismic source capable of generating detectable seismic waves, that is, waves which can be detected by sensing devices positioned in the wellbore itself, on the surface, or in an adjacent wellbore. The source can generate P-waves, $S_V$-waves, and $S_H$-waves alone or in combination to perform RVSP, crosswell tomography, and other useful operations for determining information about the formation. The seismic source can also be used to record seismic in-hole logs by recording the seismic signal using a receiver in the same well as the downhole vibrator. The receiver should be spaced a distance from the seismic source clamping means but attached to the seismic source. An attenuating spacer will be between the source and the receiver to dampen the vibrations traveling along the tool containing the source and receiver. Preferably the nondestructive downhole seismic source generates not only lower frequencies but also frequencies in excess of 100 Hz and upwards of 500 Hz or higher. As the frequency of the seismic waves generated increases, the resolution of any measurements increases. Thus properties of a thinner zone within the formation can be analyzed. This would enable the production engineers to develop specific techniques to maximize the output of hydrocarbons between producing zones and/or extend the life of the producing zones. Additionally, the seismic source can achieve nondestructive output forces of up to 4,000 lbf (18,000 newtons) from a reaction mass of only about 300 lbs (136 kg). This power is orders of magnitude greater than heretofore available from existing downhole vibratory sources such as air driven vibrators. Other impulsive sources with high seismic power output have tended to damage the wellbore.

BRIEF DESCRIPTION OF THE DRAWINGS

FIG. 1 illustrates an embodiment of a downhole seismic source within a cutaway view of a wellbore;

FIG. 2 illustrates an alternative embodiment of a downhole seismic source within a wellbore;

FIG. 3 illustrates a top view of the downhole seismic source of FIG. 2 within a wellbore;

FIG. 4 illustrates a further alternative embodiment of a downhole seismic source within a cutaway view of a wellbore;

FIG. 5 illustrates a top view of the embodiment of FIG. 4;

FIG. 6 illustrates still another alternative embodiment of a downhole seismic source within a cutaway view of a wellbore;

FIG. 7 illustrates a graph of the force output of a downhole hydraulic seismic source illustrated in FIG. 2;

FIG. 8 illustrates the generation of seismic $S_V$-waves and P-waves of a downhole seismic source;

FIG. 9 illustrates an alternative seismic wave generated by the downhole seismic source;

FIG. 10 illustrates three-dimensional reverse vertical seismic profiling using the downhole seismic source; and FIG. 11 illustrates crosswell tomography using a downhole seismic source.

FIG. 12 is a graph comparing borehole stresses between downhole sources of dynamite, airgun, and 4,000 lbf. seismic source of the invention; and FIG. 13 is a graph comparing effective energies between downhole sources of dynamite, airgun and vibrator source of the invention.

DETAILED DESCRIPTION OF THE INVENTION

The various process and apparatus embodiments of the invention will be more clearly illustrated by referring to the Figures. FIG. 1 illustrates a downhole seismic source 10 within an earth formation 100 penetrated by a wellbore 500. The seismic source 10 is lowered into the wellbore 500 with a cable 29 attached to a suitable anchoring means 28.

The seismic source 10 includes an upper body 12 incorporating a suitable clamping means to retain the source securely in place at a predetermined location within the wellbore. The clamping means should generate enough force to interlock the source 10 within the casing or wellbore without breaking wellbore, casing, or liner or damaging the cement. The clamping means should generate a force which is at least greater than the force output generated by the seismic source during operation. This is usually about twice the generated vibrating force but in any case less than the force necessary to fracture or break the casing or the wellbore liner or damage the cement. A suitable clamping means in the source 10 is illustrated as a hydraulic clamping means comprising the hydraulic pistons 14a and 14b connected together by a plate 16. During the operation of the clamping means, a hydraulic line 18, which is part of cable 29, is pressurized from the surface which forces the pistons 14a and 14b out of their liner and the engages plate 16 with the wellbore 500.

A hydraulic actuator means 22 is attached to the body 12 by any suitable means such as bolts, welds and the like. The piston 26 in the actuator 22 is capable of moving a reaction mass 24 attached thereto parallel with the wellbore to generate $S_V$-seismic waves in the horizontal direction illustrated in FIG. 8 and also P-waves from the vertical to sub-vertical (0–45 from vertical). The descriptive directions (e.g., horizontal, vertical) apply to the typical vertically-oriented well. The movement of the reaction mass 24 to generate seismic waves is illustrated as 1000. The hydraulic actuator 22 is powered by hydraulic fluid from the surface through line 20. The size of mass and length of stroke are a function of the desired amplitude and frequency of the seismic wave to be generated.

It is anticipated that actuator 22 could be adapted to be capable of moving a reaction mass 24 attached thereto in a motion perpendicular to the wellbore to generate horizontal compressional P-waves (as illustrated in FIG. 9) and vertical shear waves ($S_V$-waves) from the vertical to sub-vertical (0–45 from vertical). The movement of the reaction mass 24 to generate seismic waves is illustrated in FIG. 9 as 2000.

Alternatively, apparatus 10 can be operated so as to generate a seismic wave by engaging the clamping plate 16 with the wellbore 500 through the pressurizing of the pistons 14a and 14b. The varying of clamping forces exerted by the pistons 14a and b in a swept frequency mode generates horizontal compressional P-waves (as illustrated in FIG. 9) and vertical shear waves ($S_V$-waves) from the vertical to sub-vertical (0°–45° from vertical). The movement of the pistons to generate the seismic waves is illustrated as 2000. Though seismic waves can be generated by impacting the wellbore 500 with clamping plate 16, the preferred method has the plate 16 contacting the wellbore 500 at a force necessary to maintain the source at a fixed position. Thereafter, additional pressure is exerted on the wellbore through plate 16 in a pulsating, constant or oscillatory manner so as to generate the desired seismic wave into the formation 100. Of course, the strength and magnitude of the seismic wave 2000 is limited by the desire of not fracturing the wellbore casing or formation.

FIGS. 2 and 3 illustrate an alternative seismic source 30. The source 30 contains a housing or body 32 which includes two hydraulically actuated pistons 34a and 34b attached to a clamping plate 36 for positioning the source 30 within a wellbore 500. In this embodiment, an electrical motor driving a hydraulic pump illustrated as 38 is in communication with pistons 34a and 34b. A signal from the surface, passing through an electrical line 54 in the cable 58, causes the valve in the hydraulic pump 38 to move hydraulic pistons 34a and 34b. The movement of the pistons 34a and 34b forces the clamping means 36 into communication with the wellbore 500. A suitable electric motor and hydraulic pump means is available from Vicker's Inc., Jackson, Miss., or Moog, Inc., Buffalo, N.Y. Any pump motor combination which can operate at 100° F. and generate 5,000 psi pressure or higher at a 5 gpm flow of hydraulic fluid is suitable in the invention.

The body 32 further contains a motion sensing device 50 in communication with surface electronics so that the movement of the device within the wellbore during operation can be measured. Standard accelerometers and geophones used in wellbore environments are suitable for this application.

Connected to the base of the body 32 is an electrically controlled hydraulic actuator 40 capable of moving a reaction mass 46 through the movement of a hydraulically driven piston 44 in a linear accelerator 42. A suitable source for a hydraulic actuator linear accelerator combination is manufactured by the Moog Corporation, Buffalo, N.Y. This actuator-accelerator combination is capable of imparting a wide range of varying frequencies to reaction mass 46. These are controlled from the surface by an electronic signal sent through wire 56. The wires 54 and 56 are electrical portions of a cable 58 which has sufficient strength to lower and raise the source 30 within the wellbore 500. Cable 58 is attached to source 30 at cable anchor means 52.

The reaction mass 46 should additionally provide for a space to contain a motion sensing device 48 (such as an accelerometer) to provide a base line measurement for the frequencies generated during operation.

A top plan view of the source 30 positioned in the wellbore is illustrated in FIG. 3. The edges of the body 32 have serrated or crenelated engaging portions 32a and 32b to position the body 32 securely within a wellbore 500 when clamping plate 36 pressurized. The clamping plate 36 may also have a serrated surface 36a. The serrations 36a, 32a and 32b generate very high point forces when clamping plate 36 contacts the wellbore 500 thereby eliminating or minimizing slippage, effectively making the clamp a mechanically stiff device.

The embodiment illustrated as 30 in FIG. 2 possesses the additional benefits of not requiring hydraulic lines from the surface. Source 30 is electrically powered from the surface and has a self-contained hydraulic power supply means necessary to reciprocate the reaction mass 46 and engage the clamping means with the wellbore. This embodiment avoids the very high pressure losses encountered in long hydraulic lines when a source is positioned in a deep well and the hydraulic power is provided from the surface. By shortening the hydraulics, i.e., making the apparatus self-contained, fluid friction losses which occur in long hydraulic lines are avoided and higher forces at higher frequencies can be generated by reciprocating the reaction mass 46 and moving the plate 36. The embodiment of FIG. 1 having hydraulic lines from the surface may prove more convenient for shallow applications.

The reaction force frequency ranges for 25-lb. (11 kg) and 75-lb. (34 kg) reaction mass are illustrated in FIG. 7 for the apparatus described in FIGS. 2 and 3. The curves represent the vibration of the reaction masses parallel with the wellbore 500 to generate S-waves illustrated by the movement 1000 in FIG. 2.

FIGS. 4 and 5 illustrate a preferred embodiment of the invention. The downhole seismic source is illustrated as 60. The source 60 has a body 62 with four clamping plates 66a, 66b, 66c, and 66d, which are symmetrically and radially positioned out from the source. The plates 66a–d are engaged to meet the wellbore 500 through pistons 64a–h thereby forming a means for clamping source 60 securely to the wellbore 500. The clamping means allows transfer of seismic $S_V$, $S_H$ and radial P-waves from source 60 into the formation. In a preferred pulsating mode, the pistons 64a–h may be simultaneously pulsated radially, varying the force applied to the wellbore 500, generating seismic waves out into the formation. Of course, the source 60 can be preferably designed with only three clamps if it proves advantageous to centralize through triangulation. An advantage of this device is that it can generate radial seismic waves by oscillating the force applied to the formation through the plates in an omni-directional fashion to avoid the problems of uni-directional seismic wave generation. The device having one or more clamps can operate to perform the processes of the present invention.

The device functions as follows. A signal is sent from the surface via cable 58 to an electric motor 67 which powers a hydraulic pump 68. A servo control valve 69 (servovalve) actuates the pistons 64a–h via hydraulic line 72 and the piston actuator valve 74. The piston actuator valve 74 also controls the piston 64a-h functions which generate radial seismic waves through the pulsating of opposite pairs of pistons. The servovalve 69 directs the hydraulic fluid to either the vertical actuator 70 or rotational actuator 71 connected to the reaction mass 73. A motion sensing device 50 (such as an accelerometer) monitors the output of the seismic source 60. Suitable sources for the electric motor and the hydraulic pump combination include Reda Pump, Bartlesville, Okla. and Vickers, Inc. The servovalve and actuators along with the hydraulic pistons are available from Moog, Inc.

The downhole seismic source 60 also includes motion sensing devices 79 which are secured to the wellbore wall 500 by expandable boot 78. Suitable sensing devices 79 include geophones and accelerometers designed to detect vibration of the wellbore wall 500. The sensing devices 79 are isolated from the rest of the seismic source by an acoustic isolator 75 but connected to the device 60 by electric wires 76. The wires 76 terminate in a dewar module 77 which contains the electronics for sensing devices 79. A suitable source for the expandable boot 78 is Baker Tool of Houston, Texas.

The other motion sensing devices 50 included within the seismic source 60 are not isolated from the seismic source generating portion of the apparatus. By comparing signals from the isolated sensing devices 79 and the nonisolated devices 50, information may be obtained on the clamping effectiveness and the energy transmission into the formation. An electronics package 77 receives command signals from the surface and controls the various components of the seismic source. The electronics package also receives signals from the motion sensing devices 79 and 50 and transmits them to the surface. It is preferred that the electronics package 77 be isolated from the vibrations of actuator 60 by the acoustic isolator 75 to avoid vibration damage to sensitive electronic instruments. Further vibrational protection may be achieved by positioning the electronics package 77 below the boot 78 and motion sensing devices 79.

In this preferred embodiment, the source 60 is held in place by a separate clamping means which is distinct from the clamping means in the previous embodiments. The separation of the seismic source generation and the clamping function into distinct units permits the secure clamping of the seismic source 60 within the wellbore 500 without the potential slipping of the seismic source 60 as the seismic waves are generated. A secure clamping action is generated by the metal to metal contact of a driving wedge 82 connected to a hydraulically actuated two-way piston 81 within the body portion 80 of the clamping means. As the driving wedge 82 moves down, it forces contact wedges 83a and 83b into the wellbore 500 when driving wedge 82 moves up, it retracts contact wedges 83a and b from the wellbore 500. The metal to metal contact of the driving wedge 82 with the contact wedges 83a and 83b creates a more secure clamping action than hydraulic fluid displacement within a piston cylinder. Contact wedges 83a and 83b may also be spring loaded so they retract into the source 60 when not securing the source 60 within the wellbore 500 (helpful for example if the tool experiences a power failure). Of course, this wedge clamping means can be incorporated into any of the other embodiments if more secure clamping is desired.

The wedge clamp design of FIG. 4 may be particularly preferred when the motion of actuator vibration is in the same direction as the clamp actuators as in the case of a perpendicularly oriented actuator. The fluid filled pistons of the clamp actuators act as a shock absorber which distort or absorb vibrational energy intended to be transmitted into the formation. A driving mechanism such as hydraulic piston 81 or a mechanical screwdrive (not shown) drives a driving wedge 82 parallel to the borehole 500 which in turn drives contact wedges 83a and 83b which are dovetail to the driving wedge 82 out into contact with the wellbore 500. Such a wedge clamp design does not depend solely on hydraulic pressure in the direction of vibratory motion to secure the tool.

This preferred embodiment operates according to the following process. The device 60 of the invention will be able to generate radial, torsional, or vertical forces, one at a time. The reaction mass 73 serves as a load to both the vertical 70 and the rotational (torsional) 71 servoactuators. To achieve the size limitation, the reaction mass may be constructed of a heavy material such as Kennertium ®. A 300 lb (136 kg) reaction mass of Kennertium ® would be approximately 3.5 inches (9 cm) in diameter and 45 inches (114 cm) long. When activated, the vertical servoactuator 70 above the mass 73 drives the mass 73 up and down axially. The forces generated to move the mass 73 are reacted through the device housing 62, through the clamp 64/66 and to the wellbore wall 500. The same reaction mass 73 is attached to the rotary servoactuator 71. When activated, the rotary servoactuator 71 drives the reaction mass 73 torsionally.

Radial forces are preferably generated independent of the reaction mass. Linear servoactuators operating simultaneously and acting directly on the well pipe wall generate the radial forces. These actuators are located below the mass and act radially and are spaced symmetrically apart from each other. As illustrated in FIG. 5, four clamps 64/66 are spaced at 90° from each other. A three clamp version (not shown) would have clamps spaced at 120°. These orientations provide multidirectional force output.

Each axis of the force generation requires appropriate electronics to drive the corresponding servovalve and provide closed loop servoactuator control for that axis. The vertical servoactuator is proposed as a position control servo. A linear variable displacement transducer (LVDT position transducer) located at the bottom of the reaction mass provides mass position feedback for the axial servo. A sinusoidal position command to the vertical servoactuator will result in mass position, velocity and acceleration waveforms that are also sinusoidal.

The rotary servoactuator is also proposed as a position control servo. A rotary LVDT position transducer located at the bottom of the reaction mass provides angular position feedback for the rotary servoactuator. Prior to cycling the rotary axis a constant position command is applied to the vertical position loop to hold the mass at some nominal position off the axial end stops. A sinusoidal angular position command to the rotary servoactuator will then result in mass angular position, velocity and acceleration wave forms that are also sinusoidal. The sinusoidal acceleration is reacted at the well pipe wall through the clamp with a torque equal to the product of the mass rotational inertia and the angular acceleration.

The radial servoactuators are proposed as a pressure control servo. A single 3-way operating servovalve drives the control side of each of the three actuators. A pressure transducer sensing this common control pressure provides pressure feedback for the radial servoactuator. Prior to cycling the radial axis a nominal pressure command is applied to load the radial actuators via pads against the well pipe wall. A sinusoidal pressure command signal superimposed on the nominal loading command signal will result in a sinusoidally varying force applied radially to the well pipe wall. The absolute force at each of the actuator pads is equal to the product of the control pressure and the net area of each actuator. The radial actuators are retracted by means of a detented spring return attached to the center of each of the pads. For a sinusoidal position command signal the mass position will be given by $x_m \text{SIN}(\omega t)$. $x_m$ is the peak mass displacement and $\omega$ is the radian frequency of vibration. The mass velocity will be given by $x_m(\omega) \text{COS}(\omega t)$. The mass acceleration will be $-x_m(\omega^2) \text{SIN}(\omega t)$. The resulting output force is then $$F = m(x_m)(\omega^2) \text{SIN}(\omega t).$$

Limits on maximum force output as a function of frequency are imposed by limited stroke, supply pressure, servovalve flow and servovalve dynamics.

The rotational axis torque (force) generator uses a position servo as described previously. For a sinusoidal angular position command signal the mass angular position will be given by $\theta_m$ SIN ($\omega t$). $\theta_m$ is the peak mass angular displacement and $\omega$ is the radian frequency of vibration. The mass angular velocity will be given by $\theta_m(\omega)$ COS ($\omega t$). The mass angular acceleration will be $-\theta_m(\omega^2)$ SIN ($\omega t$). The resulting output torque is then $$T = J(\theta_m)(\omega^2) \text{ SIN } (\omega t)$$

where J is the rotational inertia of the reaction mass about the vertical axis. The resulting torsional force at the pipe wall is given by $$F = T/r$$

where r is the inside radius of the well pipe wall.

Primary limits on maximum torque (force) output as a function of frequency are imposed by limited stroke, supply pressure, servovalve flow and servovalve dynamics.

The radial axis force generator is a pressure control servo as described previously. A nominal static pressure command signal results in a control pressure ($P_o$) common to all three actuators. A sinusoidal pressure command signal added to the nominal command gives a common output pressure of $P_o + P_c$ SIN ($\omega t$). $P_c$ is the peak output pressure change from nominal ($P_o$) and $\omega$ is the radian frequency of vibration. The resulting force at each of the three interfaces of radial actuator plate and pipe wall is then $$F = P_o(A) + P_c(A) \text{ SIN } (\omega t)$$

where A is the net area of each radial actuator.

Limits on maximum radial force output as a function of frequency are imposed by supply pressure, servovalve flow and servovalve dynamics. Transfer of radial force to the pipe wall is very direct and not dependent upon a path of force transfer through the clamp.

It is anticipated that the actuator of the invention is capable of generating forces between 1000 and 18,000 newtons (220 to 4000 lbf) and even higher. A preferred level of power for many applications would be from 4000 to 18000 newtons and a preferred high range of 12000 to 18000 newtons for applications requiring higher power such as a deep VSP survey. Generating forces above 18000 newtons will place stresses on the casing cement near the maximum allowed. Cement logs should be examined in all cases, particularly when generating forces near 18000 newtons and above, to ensure the cement is not damaged.

FIG. 6 illustrates a further alternative embodiment of a nondestructive downhole seismic source 90. The seismic source 90 contains a housing 91 including a clamping means (92a and b and 93) driven to engage the wellbore 500 within the formation 100 through hydraulic pistons 92a and 92b. A hydraulic pump 88 powers the pistons 92a and 92b and a servovalve 95 which oscillates a reaction mass 97 through a piston 96 to form a $S_H$-wave. The torsional movement of the piston 96 to generate the $S_H$-wave is illustrated as 3000.

Of course, any of the above identified embodiments to generate $S_V$-waves, radial P-waves, $S_H$-waves, and P-waves can be incorporated among the various embodiments to satisfy particular applications required for a downhole hydraulic source.

FIG. 8 illustrates both graphically and pictorially the operation of a downhole source 30 of the invention (such as source 10 of FIG. 1, source 30 of FIG. 2, source 60 of FIG. 4, or source 90 of FIG. 6) within a wellbore to generate seismic waves. A logging truck 200 containing a cable 300 suspends source 30 into a wellbore 500 through an appropriate rig 400. Graphic pictorial illustration demonstrates the radial $S_V$-waves and P-wave components of a reaction mass operating reciprocatingly within the wellbore illustrated as 1000. The movement of the reaction mass generates $S_V$-waves and a weaker P-wave component.

FIG. 9 illustrates pictorially and graphically the P-wave and S-wave components of a downhole source 30 of the invention (such as source 10 of FIG. 1, source 30 of FIG. 2, source 60 of FIG. 4, or source 90 of FIG. 6) when operated so as to generate a predominantly P-wave in the horizontal direction (in relation to a vertical wellbore). The reaction forces generated by the source 30 are perpendicular to the wellbore. The movement is illustrated as 2000 in FIG. 9. The horizontal P-wave component is substantially larger than in FIG. 8.

FIG. 10 pictorially illustrates a cutaway three-dimensional view of an RVSP operation using a downhole source 30 of the invention (such as source 10 of FIG. 1, source 30 of FIG. 2, source 60 of FIG. 4, or source 90 of FIG. 6). RSVP can be easily and quickly accomplished with more beneficial results than VSP through the use of the downhole seismic source 30 to generate the seismic wave with a multitude of surface geophones 675 illustrated as strings of geophones 650a–d connected to a recording truck 600. The logging truck 200 lowers the seismic source 30 which is operated to generate the seismic waves of interest, i.e., $S_V$-waves, P-waves or $S_H$-waves, while the geophones record the direct and reflected seismic waves (1000/2000). Since the delicate geophones do not have to be lowered into the wellbore environment and a vast array of surface geophones that can be utilized, the profiling of the formation can be done more quickly and efficiently than in VSP.

FIG. 11 illustrates the use of a downhole seismic source 30 of the invention (such as source 10 of FIG. 1, source 30 of FIG. 2, source 60 of FIG. 4, or source 90 of FIG. 6) to perform crosswell tomography. In crosswell tomography, a first well 400a containing wellbore 500a contains at least one or a plurality of seismic sources, e.g. 30, which generate the desired seismic waves, i.e., $S_V$-waves, $S_H$-waves, or P-waves, directed out into the formation toward at least one receiver well 400b containing wellbore 500b.

The well 400b contains geophones 650a–n suspended therein but connected to the appropriate recording truck, not illustrated, on the surface. As the seismic source or sources 30 in well 400a generate seismic waves, these waves are recorded by receivers 650a–n within the wellbore 400b to generate a seismic picture of the geologic formation between wells 400a and 400b. Since the weathering layer normally attenuates seismic waves generated on the surface, surface tomography cannot be carried out for frequencies greater than about 100 Hz due to the attenuation problems. Of course, the lower the frequency, the less refined the readings are because the greater the wavelength of the seismic waves and thus the lower the resolution. Using a downhole seismic source enables the generation of high frequency seismic waves, i.e., greater than 100 Hz, to raise the resolution so that smaller and smaller anomalous zones within a given formation can be identified. This can be extremely valuable for applications where the producing zones are relatively thin and thus information about them is hard to obtain.

The force output using hydraulic pumps and actuators exceed the force using existing pneumatic actuators by a factor of 100 and the force output by heretofore existing electromagnetic actuators by a factor of 20–40. The frequency output of the hydraulic actuators is between 10–1500 Hz. The maximum frequency of the pneumatic vibrator is approximately 100–200 Hz. The difference is frequency output is due to the vast difference in the stiffness between a gas and a fluid.

The motion sensing devices 78 shown in FIG. 1 also enable the present invention to operate as a downhole seismic logging tool. The seismic vibrations generated by the actuator 30 travel into the formation 100 where they are reflected or refracted back and then detected by the sensing devices 78. By analyzing the signals detected, information about the formation surrounding the wellbore may be deduced. Most surface seismic recording is in a range of 10 to 200 hz. The downhole vibrator of the present invention may generate seismic signals at the same frequency as that recorded from surface seismic sources. Logs obtained by the present invention using the same frequency as surface generated seismic data will provide better correlation with surface generated seismic data than that obtained by existing logging tools which operate at much higher frequencies. The present invention also has greater wave penetration than existing tools because of its higher power output capability.

Three component geophones are preferred for the motion sensors 78. Though FIG. 4 illustrates only a single motion sensor package (76 and 78), a series of separately coupled sensor packages is envisioned. Each sensor package would be acoustically isolated from both the other seismic sensor packages and the seismic source housing 32.

The invention has been described with reference to particularly preferred processes of using the downhole seismic source and particularly preferred embodiments of the hydraulic down seismic vibrator source. Modifications which would be obvious to one of ordinary skill in the art are contemplated to be within the scope of the invention.

What is claimed is:

1. A downhole seismic source comprising:
   a housing;
   a reaction mass attached to and in said housing;
   means for clamping the housing at a predetermined fixed position within a wellbore; and
   means for hydraulically moving said reaction mass to generate at least one detectable seismic wave of predetermined frequencies attached to said housing such that forces are reacted from the reaction mass through the housing and the means for clamping into the wellbore.

2. The downhole seismic source according to claim 1 wherein the means for hydraulically generating is a hydraulic actuator capable of generating forces in excess of about 1000 newtons.

3. The downhole seismic source according to claim 1 wherein the means for hydraulically generating is a hydraulic actuator capable of generating forces of between about 12,000 and 18,000 newtons.

4. The downhole seismic source according to claim 1 wherein the seismic wave has a maximum frequency of between about 10 Hz and 1500 Hz.

5. The downhole seismic source according to claim 1 wherein the source sweeps the seismic wave from 0 Hz up to a frequency of between about 10 Hz and 1500 Hz.

6. The downhole seismic source according to claim 1 wherein the source sweeps the seismic wave from a frequency of between 10 Hz and 1500 Hz down to 0 Hz.

7. The downhole seismic source according to claim 1 wherein the means for hydraulically generating is a hydraulic actuator capable of moving the reaction mass in a direction parallel to the wellbore.

8. The downhole seismic source according to claim 7 wherein the force output of said downhole seismic source is given by the relationship $$F = m(x_m)(\omega^2) \, SIN \, (\omega t)$$

where F is force output, m is reaction mass, $x_m$ is peak mass displacement, $\omega$ is the radian frequency of vibration, and t is time.

9. The downhole seismic source according to claim 1 wherein the means for hydraulically generating is a hydraulic actuator capable of moving the reaction mass in a direction perpendicular to the wellbore.

10. The downhole seismic source according to claim 1 wherein the means for hydraulically generating is a hydraulic actuator capable of moving a reaction mass torsionally about its axis which is parallel to the wellbore.

11. The downhole seismic source according to claim 1 wherein the force output of said downhole seismic source is given by the relationship $$F = J(\theta_m)(\omega^2) \, SIN \, (\omega t) / r$$

where F is force output, J is rotational inertia of the reaction mass about its vertical axis, $\theta_m$ is peak mass angular displacement, $\omega$ is the radian frequency of vibration, t is time, and r is inside radius of the wellbore.

12. The downhole seismic source according to claim 1 wherein said reaction mass has a motion sensing device attached thereto.

13. The downhole seismic source according to claim 1 wherein said means for hydraulically generating is a rotational actuator.

14. The downhole seismic source according to claim 1 wherein said means for clamping is capable of generating at least one seismic wave by varying the clamping force it exerts on the wellbore at predetermined frequencies.

15. The downhole seismic source according to claim 14 wherein the force output of varying the clamping force is given by the relationship $$F = P_o(A) + P_c(A) \, SIN \, (\omega t)$$

where F is force output, $P_o$ is nominal pressure, on the actuators A is net area of each hydraulic actuator contacting the wellbore, $P_c$ is peak output pressure change from $P_o$, $\omega$ is the radian frequency of vibration, and t is time.

16. The downhole seismic source according to claim 14 wherein the seismic wave has a maximum frequency of between about 10 Hz and 1500 Hz.

17. The downhole seismic source according to claim 14 wherein the seismic wave can sweep from 0 Hz up to a frequency of between about 10 Hz and 1500 Hz.

18. The downhole seismic source according to claim 14 wherein the seismic wave can sweep from a frequency of between about 10 Hz and 1500 Hz down to 0 Hz.

19. The downhole seismic source according to claim 1 wherein said means for clamping is also capable of generating at least one seismic wave within a formation by:
   (1) exerting
      (a) a lower clamping force which is at least equal to the clamping force necessary to maintain the source at a fixed position, and
      (b) a greater clamping force than the lower clamping force; and
   (2) alternating between the two clamping forces at predetermined frequencies.

20. The downhole seismic source according to claim 1 wherein the means for moving said reaction mass is further comprised of:
   a hydraulic actuator means for moving the reaction mass in a direction parallel to the wellbore; and
   a hydraulic actuator means for moving the reaction mass torsionally about its axis which is parallel to the wellbore.

21. The downhole seismic source according to claim 1 wherein said means for clamping is capable of generating at least one seismic wave by varying the clamping force it exerts on the wellbore at predetermined frequencies.

22. The downhole seismic source according to claim 1 further comprising at least one motion sensing device, said motion sensing device being acoustically isolated from said actuator and capable of being independently coupled to the wellbore.

23. The downhole seismic source according to claim 22 wherein said motion sensing devices are selected from the group consisting of: geophones, accelerometers, and combination thereof.

24. The downhole seismic source according to claim 1 further comprising a nonisolated motion sensing device attached to said housing.

25. The downhole seismic source according to claim 24 wherein said motion sensing devices are selected from the group consisting of: geophones, accelerometers, and combinations thereof.

26. The downhole seismic source according to claim 22 further comprising a nonisolated motion sensing device, said nonisolated motion sensing device being acoustically coupled to said actuator.

27. The downhole seismic source according to claim 26 wherein said motion sensing devices are selected from the group consisting of: geophones, accelerometers, and combinations thereof.

28. The downhole seismic source according to claim 1 wherein said means for clamping includes clamping means selected from the group consisting of: one hydraulic clamp, two hydraulic clamps, three hydraulic clamps, or four hydraulic clamps, wherein said clamps radially extend out from said housing.

29. A downhole seismic source comprising:
   a housing;
   a reaction mass in said housing;
   means for clamping the housing at a predetermined position within a wellbore;
   hydraulic means for moving said mass vertically to generate at least one detectable seismic wave;
   hydraulic means for moving said reaction mass torsionally to generate at least one detectable seismic wave;
   a second clamping means;
   hydraulic means for generating forces with said second clamping means to generate at least one detectable seismic wave.

* * * * *